Figure 1:
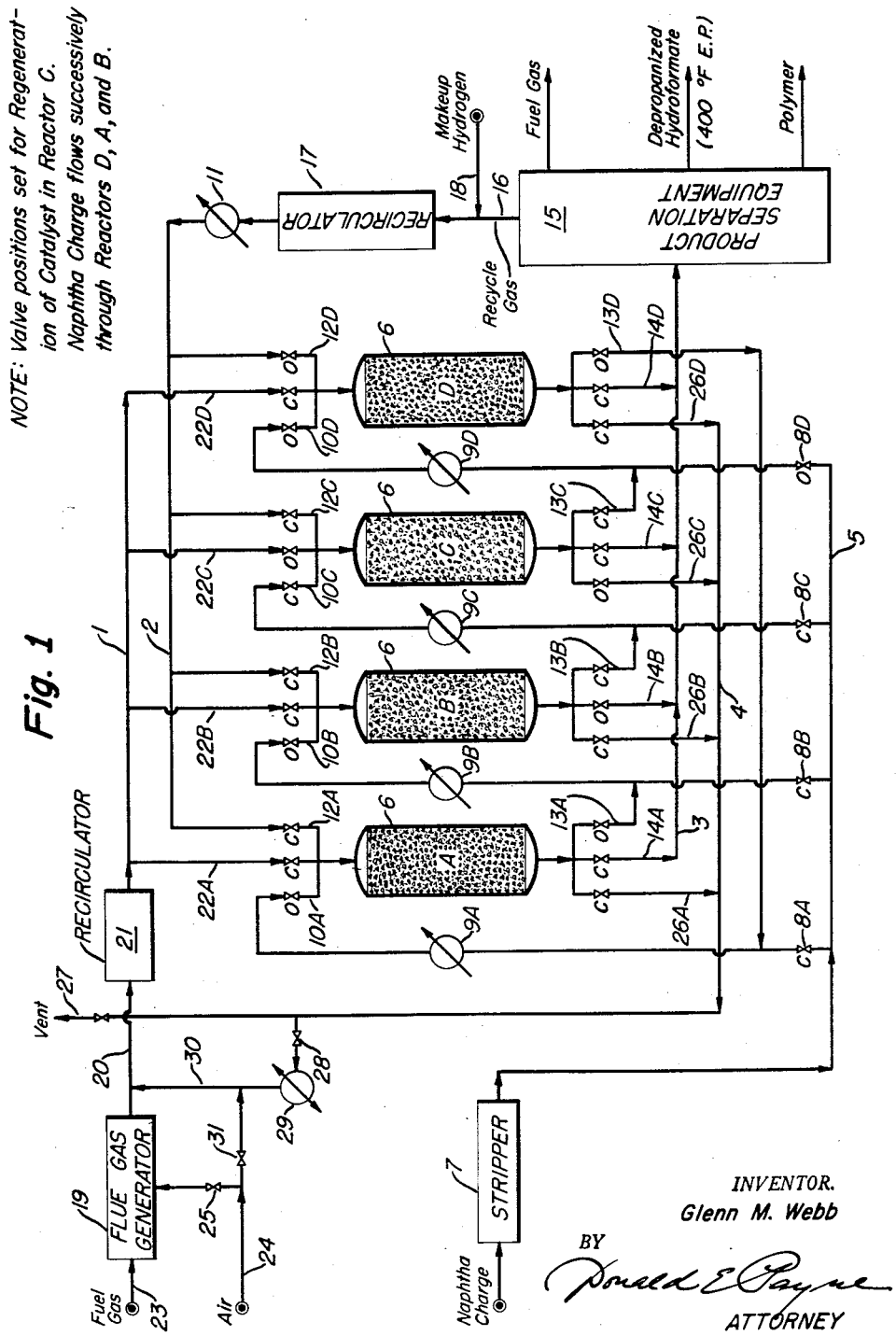

United States Patent Office 3,011,968
Patented Dec. 5, 1961

3,011,968
REJUVENATION OF PLATINUM-TYPE
HYDROFORMING CATALYSTS
Glenn M. Webb, Western Springs, Ill., assignor to Standard Oil Company, Chicago, Ill., a corporation of Indiana
Filed May 21, 1956, Ser. No. 586,302
38 Claims. (Cl. 208—140)

This invention relates to the reforming of hydrocarbons and particularly to the hydroforming of hydrocarbons in the presence of catalysts of the noble-metal type. More specifically, my invention relates to the rejuvenation of platinum and/or palladium-containing catalysts after deactivation and carbonization thereof in the hydroforming of hydrocarbons.

The so-called "hydroforming" process, in its original form, employed a molybdena-alumina catalyst under conditions of elevated temperature and pressure for the reforming of hydrocarbons in the presence of hydrogen, and produced results that were greatly superior to the prior-art processes in terms of product quality. The yield-octane relationship, however, left something to be desired, and the catalyst became carbonized and deactivated rapidly, so that frequent regeneration was necessary. These shortcomings of the process were remedied to some extent by the recent development of platinum-type alumina-supported hydroforming catalysts. The new catalysts are capable of producing a substantially improved yield-octane relationship, and some of them are capable of producing substantially continuous operation for extended periods of time, when operated with carefully chosen charging stocks and rigidly controlled conditions of temperature, pressure, and space velocity. The preparation of a number of catalysts of this type is hereinafter described. Other suitable catalysts are the halogen-containing platinum-alumina of Vladimir Haensel, described in U.S. Patent 2,479,109 (August 16, 1949) and the silica-alumina supported platinum and palladium catalysts of Frank G. Ciapetta, described in U.S. Patent 2,550,531 (April 24, 1951). All of the various catalysts, however, ultimately become deactivated by one mechanism or another, presumably by degradation, masking, or poisoning of the active centers; and while various patents relating to the new development assert that the platinum-containing catalysts can be reactivated by combustion of carbonaceous deposits therefrom, no such process has heretofore been commercially developed, because it was found that such reactivation not only failed to restore the catalyst to its initial level of activity and selectivity, but also permitted or encouraged an increasingly rapid decline in catalytic properties during subsequent use.

A disadvantage of platinum-type catalysts lies in their behavior pattern with respect to activity, selectivity, and stability over a range of pressures. At high reactor pressures in the range of about 500 to 750 pounds per square inch gage (hydrogen partial pressures above about 350 pounds per square inch), these catalysts have satisfactorily long lives without intermediate reactivation if the hydroformer feed stock is carefully selected; however, at a given catalyst activity in terms of product octane level, the catalyst selectivity in terms of yield of reformate is low compared to the yield obtainable under otherwise comparable conditions at low reactor pressures around 200 pounds per square inch. At the lower pressures, on the other hand, platinum-type catalysts are less stable in catalytic properties, and maintain their superior activity and selectivity for only relatively short periods. In order to permit continued operations at such pressures, I have therefore developed means for restoring the properties of the catalyst, and have incorporated such means into the process cycle in carrying out the process of the present invention.

The prior art indicates that platinum hydroforming catalysts may be regenerated by oxidation of the carbon therefrom at an elevated temperature not exceeding 1200° F., followed by an optional hydrogen treatment of the carbon-depleted catalyst. The prior art further indicates that an exhausted platinum-type hydroforming catalyst may be reactivated by burning carbon therefrom with dilute oxygen at 900–950° F., temperatures in excess of 1000° F. being alleged to impair the catalyst activity. These techniques, I have now found, are ineffective for adequately restoring the activity and selectivity of spent platinum-type catalysts; in each regeneration cycle, the catalyst is brought to levels of activity and selectivity somewhat below those levels in the previous hydroforming cycle, and the rate of decline in catalytic properties is greater than in the previous use of the catalyst. Consequently, the catalyst degenerates and the hydroforming process at lower pressures becomes ineffective and uneconomical. Moreover, I have found that the oxygen-treatment of a typical carbonized platinum catalyst (e.g., containing in excess of about 0.1 percent by weight of carbon) at temperatures above 900° F. may result in the serious impairment or total destruction of its hydroforming activity. It appears therefore that the prior art does not define an operative method for the rejuvenation of such catalysts, and that the prior-art workers did not determine or recognize the critical techniques and conditions necessary for carrying out the desired rejuvenation to produce a long, stable catalyst life.

I have now discovered a new technique whereby a low-pressure hydroforming process may effectively be carried out in continuing operation, notwithstanding the relatively rapid degeneration of the catalyst under such pressure conditions, by employing intermittently a procedure whereby the catalyst is rejuvenated and restored to substantially its initial catalytic state or better. In carrying out my invention, a hydroforming operation is conducted, employing a platinum-type hydroforming catalyst at a pressure in the lower range as hereinbefore set forth for maximum activity and selectivity of the catalyst; and after the catalyst has deteriorated to a predetermined degree with accompanying carbonization, contact of hydrocarbon therewith is temporarily halted. The catalyst is then burned substantially free of carbon with an oxygen-containing gas; it is next subjected to an oxygen soak under certain conditions of time, temperature, and oxygen partial pressure, to be defined hereinafter; and it is then contacted with hydrogen under reducing conditions, suitably by return to use in the hydroforming operation. The catalyst is restored thereby to substantially its initial activity and selectivity when freshly prepared and to substantially its initial stability, i.e., its capacity for maintaining its activity and selectivity during contact with the hydroformer charging stock. The hydroforming operation then continues, and as the catalyst degenerates, the catalyst restoration and hydroforming operations are alternately repeated.

While the nature of catalytic activity and the mechanism of catalytic processes are difficult to discern in most cases, I suggest that the decrease in activity of platinum-type hydroforming catalysts may be due to a reorientation process through annealing of the platinum or palladium crystallites during exposure to the hydroforming temperature range, whereby the crystallites are caused to assume an unstrained state. In the unstrained state, the catalytic metals might be expected to be sluggish in their ability to bring about oxidation, reduction, and the several reactions involved in the hydroforming process. In treating the catalytic metal by exposure to oxygen at high temperature according to my new process, the metallic bulk tends to be increased because the oxides thereof are less dense (as much as 20 percent less) than the metal; and when the oxides are thereafter subjected to reduction, the resulting shrinkage produces strains or rifts in the oxide and in the regenerated metal centers. If, after the oxygen soaking period, the catalyst is cooled rapidly to a temperature below the recrystallization point of the catalytic metal or of any oxides formed therefrom, the said strains or rifts may be accentuated and fixed therein. My tests have demonstrated that the catalyst, after treatment in these ways, exhibits the same hydroforming characteristics as when it was freshly prepared. Thus, my invention may involve the steps of treating a spent platinum-type hydroforming catalyst at elevated temperature to convert at least a portion of the platinum-group metal therein into a reducible derivative containing the metal in expanded, less dense, or less concentrated form and containing the metal at a valency greater than zero, and thereafter reconverting the said derivative, e.g. by reduction, into the catalytic metal. It is also possible that my rejuvenation treatment may serve to sweep out volatile impurities from the spent catalyst, and thereby assist in restoring its activity. It is to be understood, however, that the foregoing theories are offered only as plausible explanations of the mechanism whereby my invention achieves its improved results, and that I do no wish to be bound thereby.

One object of my invention is to effect an improvement in the reforming of hydrocarbons. Another object is to effect an improvement in catalysts for the hydroforming of hydrocarbons. Another object is to effect an improvement in the adiabatic hydroforming of hydrocarbons with platinum-group metal hydroforming catalysts under coke-forming conditions. A further object is to provide a means for the reactivation of platinum-alumina and palladium-alumina hydroforming catalysts, and variants thereof. A further object is to rejuvenate deactivated platinum-group metal hydroforming catalysts and to permit their effective reuse in the hydroforming process. An additional object is to restore the active catalytic centers of deactivated platinum-type catalysts. Other objects are to remove carbon from platinum-type hydroforming catalysts without damage to the catalytic substances contained within such catalysts, to remove from platinum-type hydroforming catalysts any materials of unknown composition which tend to mask the active centers present therein, and to increase the useful life of platinum-group metal hydroforming catalysts. Other objects of my invention and its advantages over the prior art will be apparent from the present description thereof and from the appended claims.

Thus, in one aspect, my invention comprises the steps of subjecting a deactivated and carbonized platinum-type hydroforming catalyst to oxidation under conditions effective to convert a substantial proportion of the catalytic metal into an oxide thereof while avoiding any substantial degradation of the catalytic metal or its derivative by physical or chemical interaction with the supporting material, and thereafter contacting the catalyst with a hydrogen-containing gas under conditions of temperature and pressure effective to reduce the metal oxide to catalytically active metal.

In a more specific embodiment, my invention comprises the steps of subjecting a deactivated and carbonized catalyst to a mild oxidation with dilute oxygen to remove the readily oxidizable carbon therefrom, thereafter subjecting the treated catalyst to a more severe oxidation at a temperature above about 950° F., whereat substantially all of the residual oxidizable carbon is removed and a substantial proportion (i.e., 10 to 20 percent or more) of the platinum or palladium is converted into an oxide thereof, and finally exposing the oxidized catalyst to contact with a hydrogen-containing gas at a temperature in the hydroforming-process range. The catalyst is thereby restored to substantially the original activity and selectivity thereof when freshly prepared and to substantially its initial capacity for maintaining its activity and selectivity during contact with the charging stock.

In another aspect, my invention is a cyclic hydroforming process which comprises the following steps:

(1) A hydrocarbon charging stock, suitably a naphthenic petroleum fraction, is contacted under hydroforming conditions in a hydroforming zone at a temperature between about 850 and 1000° F., a pressure of 50 pounds per square inch gage or higher, a hydrogen partial pressure of 30 pounds per square inch or higher, and a liquid hourly space velocity between about 1 and 4 or higher with a catalyst consisting essentially of pure alumina and between about 0.1 and 1 percent by weight of platinum together with the amount of chloride that is inherently introduced into the catalyst with platinum chloride during catalyst preparation, whereby the catalyst accumulates carbon and falls in activity and selctivity below its initial level.

(2) The catalyst is thereafter withdrawn from the on-stream hydroforming conditions; and after a preliminary purge with an inert gas, the catalyst is regenerated by burning carbon therefrom with air or other oxygen-containing gas at a controlled temperature below the sintering point of the catalyst, suitably between about 825 and 1300° F., and preferably with an average bed temperature below about 900° F. and a combustion zone temperature below about 1200° F.

(3) The resulting carbon-depleted catalyst is rejuvenated by contacting it with air or other gas containing oxygen at a partial pressure substantially higher than that of atmospheric air, i.e. above about 0.4 atmosphere and preferably about 1 atmosphere or more, and a temperature above about 950° F. but below the sintering point of the catalyst, preferably below about 1300° F. and optimally between about 1000 and 1200° F., for a period of time, ordinarily 1 to 24 hours, sufficient to bring the catalyst substantially to its original state of activity, selectivity, and rate of decline.

(4) Finally, the catalyst is purged with an inert gas, and is returned directly to the hydroforming phase of the process, wherein it conveniently receives a hydrogen treatment, through the action of the hydrogen in the recycle gas, at a temperature within the hydroforming range, effective to restore the catalytic metal centers. Such restoration takes place through reconversion of the metal oxide or other derivative to the metal in highly active form, or through other mechanisms not well understood. Alternatively, the catalyst may otherwise be exposed to reducing conditions at a temperature within the range of about 600 to 1000° F., and may then be returned to the hydroforming operation.

In another aspect of my invention, the rejuvenation treatment of step 3, described hereinabove, need not be carried out after each carbon burn-off treatment of the catalyst, but may be deferred until a time subsequent to a series of such carbon burn-off treatments, suitably a time at which the catalyst has undergone an excessive degree of degeneration of "quasi-permanent" nature, in the sense that the catalyst is not restored to its original properties by a carbon burn-off of the kind described in step 2 hereinabove.

In another aspect, my invention comprises a rejuvenation process per se, in which a spent platinum hydroforming catalyst is subjected to an oxygen soak according to the procedure defined in step 3 hereinabove. The catalyst to be treated in this way should preferably be low in carbon content, and should accordingly be withdrawn from hydroforming conditions before the carbon content thereof exceeds about 0.1 percent by weight, or should be subjected to a preliminary carbon burn-off as described in step 2 hereinabove to reduce the carbon content to a suitably low level by burning readily combustible carbonaceous material. In this aspect, my invention is especially advantageous when employed in hydroforming operations conducted at higher pressures, for example above about 500 pounds per square inch gage.

The treatment of catalysts according to my invention by exposure to oxygen at elevated temperatures can successfully be applied to any platinum-type hydroforming catalyst, provided only that the treatment be carried out under circumstances which avoid fusing or sintering of the catalyst support, with consequent masking of the active catalyst centers or destruction thereof by formation of compounds or complexes. To avoid such effects, I find it desirable to limit the temperature of the catalyst at any stage of the process to a maximum of around 1300° F. or somewhat higher, and I prefer to limit the temperature to a maximum of about 1200° F., especially in the treatment of halogen-containing catalysts, which are somewhat more susceptible to high-temperature degradation than other catalysts. In all cases, the undesirable effects of high temperatures are increased by longer exposure times and by higher oxygen concentrations in the treating gas, so that the higher the temperature the shorter the permissible exposure time and/or the lower the permissible oxygen concentration, and vice versa. The regulation of the catalyst temperature is readily accomplished during the oxygen-soak period, at which time the catalyst is ordinarily quite low in carbon content. When a preliminary carbon-burn-off period is employed, however, so much heat is released during such period that it is necessary to operate at lower gas-inlet temperatures, to employ higher gas rates, to employ higher proportions of diluents with the oxygen or air, and/or to employ cooling by indirect heat exchange, in order to avoid runway temperatures. When the carbon burn-off operation is carried out under isothermal conditions, employing a regeneration vessel or vessels equipped with jackets, bayonet tubes, or other indirect heat-exchange means, the oxidizing gas may suitably be air, diluted if desired with flue gas or an inert gas such as nitrogen, to an oxygen content between about 0.5 and 20 percent, e.g. 2 to 10 percent, and preferably employed at the pressure of the hydroforming operation. In such vessels, I may employ an oxygen partial pressure between about 0.1 and 100 pounds per square inch, preferably between about 1 and 50 pounds per square inch, the higher oxygen partial pressures being employed at the lower temperatures and lower carbon contents. In adiabatic regeneration vessels, the heat of combustion during the carbon burn-off period is removed from the treating zone primarily as sensible heat of the flue gas, and the required gas rate can conveniently be calculated from available data on specific heats and heats of combustion. In such vessels, the oxygen content of the regeneration gas should lie between about 0.5 and 2 percent in order to avoid excessively high temperatures. A contact time between about 0.2 and 5 hours is ordinarily sufficient to remove substantially all of the readily oxidizable carbon, leaving less than about 0.1 percent by weight of carbon on the catalyst. In fixed-bed reactors, I prefer to operate at a contact time between about 1 and 3 hours, whereas in fluidized-catalyst systems I prefer to operate at considerably short contact times, of the order of one minute or less up to one hour. The proportion of residual carbon varies somewhat according to the oxidation time and conditions and also according to the age of the catalyst. When a fresh catalyst, for example, has been carbonized, it is readily oxidized to a carbon level around 0.01 percent by weight, whereas a catalyst of similar composition was observed to have accumulated somewhat more than 0.05 percent by weight of refractory carbon at the end of 1750 hours on stream in a cyclic hydroforming process employing a low-temperature reactivation treatment of the catalyst with dilute oxygen at 20-hour intervals.

The conditions employed in the oxygen-soaking or rejuvenation period will vary to some extent, depending upon the particular catalyst, the charging stock, the hydroforming conditions previously employed, and the length of time and/or number of cycles the catalyst has been on stream. A catalyst which has become severely deactivated requires a higher temperature, a higher oxygen partial pressure, and/or a longer exposure time than a catalyst which has suffered a less severe deactivation sufficient to cause a low of only 5 to 10 octane numbers in the hydroformate produced therewith. The carbon content of the catalyst, the oxidation temperature, and the oxygen partial pressure of the oxidizing gas should be so chosen and correlated as to avoid any substantial fusion or sintering of the catalyst support. Ordinarily, I find it satisfactory to carry out the oxygen soak at any oxygen partial pressure of about 0.4 to 10 atmospheres or higher, preferably about 1 to 4 atmospheres, and at a temperature above about 950° F. and below the sintering temperature of the catalyst, preferably below about 1300° F., and optimally between about 1000 and 1200° F. For a relatively fresh catalyst which has been only slightly deactivated, rejuvenation can be effected by an oxygen soak of only 5 or 10 minutes at low oxygen partial pressure within the defined range, while for a catalyst which has been used over a long period and has been deactivated to a greater extent, the required rejuvenation time may be 10 hours or more. I have treated badly deactivated catalysts for as long as 24 hours, with good results. Under the foregoing conditions, substantially all of the oxidizable carbon is removed from the catalyst and a substantial proportion of the platinum or palladium is converted into an oxide thereof. I prefer to rejuvenate a fixed-bed catalyst before its activity (expressed in terms of CFR-R octane number under given operating conditions) has declined more than about 4 units below the initial level, or before its selectivity (expressed in terms of volume-percent yield of stabilized 400° F. end-point reformate at a given octane number) has declined more than about 4 units below the initial level, in which cases effective rejuvenation can be effected by contact with oxygen at a partial pressure of about 0.4 to 4 atmospheres at a temperature in the range of 950 to 1100° F. for 0.1 to 10 hours, suitably around 5 hours. In operating with fluidized and with moving bed catalysts, I adjust the catalyst-to-oil ratio and the rate of withdrawal and rejuvenation so as to maintain the product pool at the desired quality level. I prefer to effect the rejuvenation with air at superatmospheric pressure, i.e. at approximately the same pressure as is employed in hydroforming or about 50 to 1000 p.s.i.

FIGURE 1 illustrates an embodiment of my invention in a hydroforming process employing a series of essentially adiabatic fixed-bed reactors. Four reactors are depicted, of which three are normally on stream while the fourth is subjected to reactivation and is then held in stand-by status until needed. In the flow scheme illustrated by the drawing, the naphtha charging stock flows successively through three reactors, being preferably contacted last with the freshest catalyst in terms of on-stream time since being reactivated. In this flow scheme, the lead reactor initially effects a preponderant share of the hydroforming reactions and exhibits the greatest temperature drop. The tail reactor effects a comparatively small proportion of the reactions and exhibits a smaller temperature drop; it tends therefore to become deactivated more rapidly, since the rate of deactivation increases with higher average catalyst bed temperature. When any one of the reactors has become deactivated to an undesirable extent, as evidenced by a decline in product yield and/or quality, the deactivated reactor is withdrawn from on-stream conditions for reactivation, the reactivated stand-by reactor is returned to on-stream conditions in the tail position, and operations are resumed with the other two reactors in the lead and intermediate positions. In the drawing, the positions of the various valves (designated by "o" for "open" and "c" for "closed") are set for rejuvenating the catalyst in reactor C, while the naphtha charge flows successively through reactors D, A, and B. Interchange of the reactors is effected by manifolds 1, 2, 3, 4, and 5, which are connected by means of appropriate valved lines to the various elements of process equipment. The drawing is broadly diagrammatic in character and it is to be understood that additional pumps, valves, separators, measuring and control instruments, and the like are to be supplied where needed. Each of the four reactors is packed with pelleted platinum-alumina catalyst 6, preferably based on a Heard-type alumina gel, prepared as described in Reissue Patent 22,196 (October 6, 1942). The catalyst can suitably be prepared by cogelling with the said alumina a suspension of platinum sulfide equivalent to about 0.1 to 1 percent by weight, preferably about 0.6 percent by weight, of platinum, calculated on the basis of dry $Al_2O_3$, and thereafter drying, crushing, pelleting, redrying, and calcining. I prefer to employ a catalyst prepared by commingling alumina hydrosol with a mixture of aqueous chloroplatinic acid and ammonium polysulfide solution; such catalysts contain an amount of chloride on a weight basis corresponding approximately to the amount of platinum since this results from the use of chloroplatinic acid as the source of the platinum. Other catalysts may be employed as described herein, comprising other supporting materials and other forms of platinum and/or of palladium, optionally with additional catalytic components.

A naphtha charging stock is vacuum-purged in stripper 7 to remove dissolved gases and water. Thereafter, it flows through manifold 5 and valved line 8D into heater 9D, where it is vaporized and superheated, and the vapors are lead through valved line 10D into the top of reactor D. The charging stock is a conventional hydroforming feed, which may have a boiling range extending from 100 to 400° F. or even somewhat higher, since any resulting tendency to deposit carbon is a matter of little concern in view of the rejuvenation feature of my process. Ordinarily a charging stock boiling within the range of about 200 to 380° F. is used. The charging stock should have as low a sulfur content as is economically practicable, preferably less than about 50 parts per million, calculated as elemental sulfur, e.g., between about 5 and 30 parts per million. A recycle gas stream comprising ordinarily about 80 percent hydrogen is also introduced into the top of reactor D by way of heater 11, manifold 2, and valved line 12D. The mixture of charging stock and recycle gas flows downward through the catalyst bed, where the hydroforming reactions are carried out at a temperature preferably between about 850 and 1000° F., a pressure between about 50 and 350 pounds per square inch gage, preferably around 200 to 300 pounds per square inch, a hydrogen partial pressure between about 30 and 250 pounds per square inch, a hydrogen rate of 2,000 to 10,000 standard cubic feet per barrel of charging stock, and an hourly weight-space velocity of 3 to 12 in each reactor. The reactor operates in a substantially adiabatic manner; and since the hydroforming reactions are predominantly endothermic, the temperature of the reaction stream initially exhibits a falling gradient of 50 to 100° F. or more during its passage through the lead reactor. The treated stream emerging from the bottom of reactor D is therefore led through valved line 13D to reheater 9A, where it is restored to the desired initial reaction temperature. From there it passes through valved line 10A into the top of reactor A, where it is again treated under substantially the same conditions as in reactor D, and subsequently it flows through valved line 13A, reheater 9B, and valved line 10B into the top of reactor B for a third treatment as in reactor D. The reaction products emerge from the bottom of reactor B through valved line 14B and manifold 3 to conventional product separation equipment 15, from which a major portion of the product gas (largely hydrogen) is withdrawn through line 16 and recycled by recirculator 17 through heater 11, manifold 2, and valved line 12D to the top of reactor D. The recycle gas may, by suitable means not shown, be purified by contact with an amine solution, silica gel, charcoal, activated carbon, or other conventional means to remove water, hydrogen sulfide, and/or olefins or saturated hydrocarbons that may be present therein. Makeup hydrogen is added if required through line 18 to line 16. The reaction products are further separated in equipment 15 into a depropanized hydroformate (400° F. end point), a high-boiling polymeric bottoms product, and gaseous hydrocarbons. The latter may conveniently be commingled with any excess hydrogen produced in the process for use as a fuel gas.

During the on-stream period, the catalyst accumulates carbon and eventually undergoes a substantial decline in activity and selectivity. In the drawing, the catalyst in reactor C has been spent in this way, and has been temporarily withdrawn from the hydroforming conditions for reactivation treatment. After the flow of charging stock to reactor C has been stopped, the reactor is purged by charging stock by continuing the flow of recycle gas. Thereafter, the recycle gas is stopped, and the reactor is purged of hydrogen by means of flue gas from generator 19, introduced at hydroforming pressure through line 20, recirculator 21, manifold 1, and valved line 22C into the top of the reactor. Generator 19 is supplied with fuel gas through line 23 and with air through line 24 and valved line 25. The purged material flows from the bottom of the reactor through valved line 26C, manifold 4, and valved vent line 27. After the purging has been completed, the vent line is closed wholly or in part, and flue gas is recycled through reactor C by way of valved line 28, heat exchanger 29, and line 30. Air is then introduced through valved line 31 into the flue-gas cycle to a suitable oxygen content, usually not more than about 2 percent, the flue gas is adjusted to a reactor inlet temperature suitably between about 700 and 800° F., and the carbon is burned thereby from the catalyst in a combustion front that moves progressively from the top to the bottom of the catalyst bed. The air concentration, the recycle gas temperature, and the gas flow rate are adjusted to hold the average bed temperature below about 900° F. and the maximum temperature of the combustion front between about 825 and 1300° F., preferably below about 1200° F. The carbon content of the catalyst is ordinarily reduced to a level below about 0.05 percent by weight in a total burn-off time of about 2 to 5 hours. The appearance of free oxygen in the flue gas leaving the reactor is a convenient indication of the substantial completion of carbon removal, the flow of oxidizing gas being preferably continued for an additional short period until a substantial proportion, e.g. approximately half, of the initial oxygen content thereof appears in the effluent gas.

The foregoing carbon burn-off treatment is initially sufficient to restore the catalyst to levels of activity and selectivity approaching the original levels of the catalyst when freshly prepared. The completeness of restoration, however, gradually falls off at each cycle until eventually, after the catalyst has been exposed to on-stream or other conditions sufficient to produce an objectionable degree of quasi-permanent deactivation, it is desirable to rejuvenate the catalyst by soaking in oxygen at elevated temperature. In this step I employ an atmosphere of oxygen, either pure or diluted to a minimum oxygen partial pressure of about 0.4 atmosphere, preferably about 1 to 4 atmospheres, at a temperature between about 950 and 1300° F. I ordinarily employ air at the pressure utilized in the hydroforming process, and I preheat the air to a temperature preferably between about 1000 and 1200° F. by adding thereto a fuel gas such as natural gas, propane, butanes, or the like, from line 23, suitably in flue-gas generator 19 or other combustion zone. During a soaking period of about 1 to 5 hours, the carbon content of the catalyst is ordinarily reduced to less than about 0.01 percent by weight. The introduction of air is then discontinued, the catalyst is purged free of oxygen with flue gas, while simultaneously it is adjusted to the desired hydroforming temperature, and the catalyst is finally exposed to hydrogen or recycle gas at hydroforming temperature and pressure for a period of 0.1 to 1 hour. When the product quality and/or yield fall below the desired levels, the most severely deactivated reactor, for example reactor D, is taken off-stream for regeneration or rejuvenation, depending upon the condition of the catalyst therein. Simultaneously, reactor C is returned by a suitable manipulation of valves to the hydroforming operation, wherein it functions as the tail reactor, following reactor B. The product quality and yield are maintained at the desired levels in this way.

Figure 2:
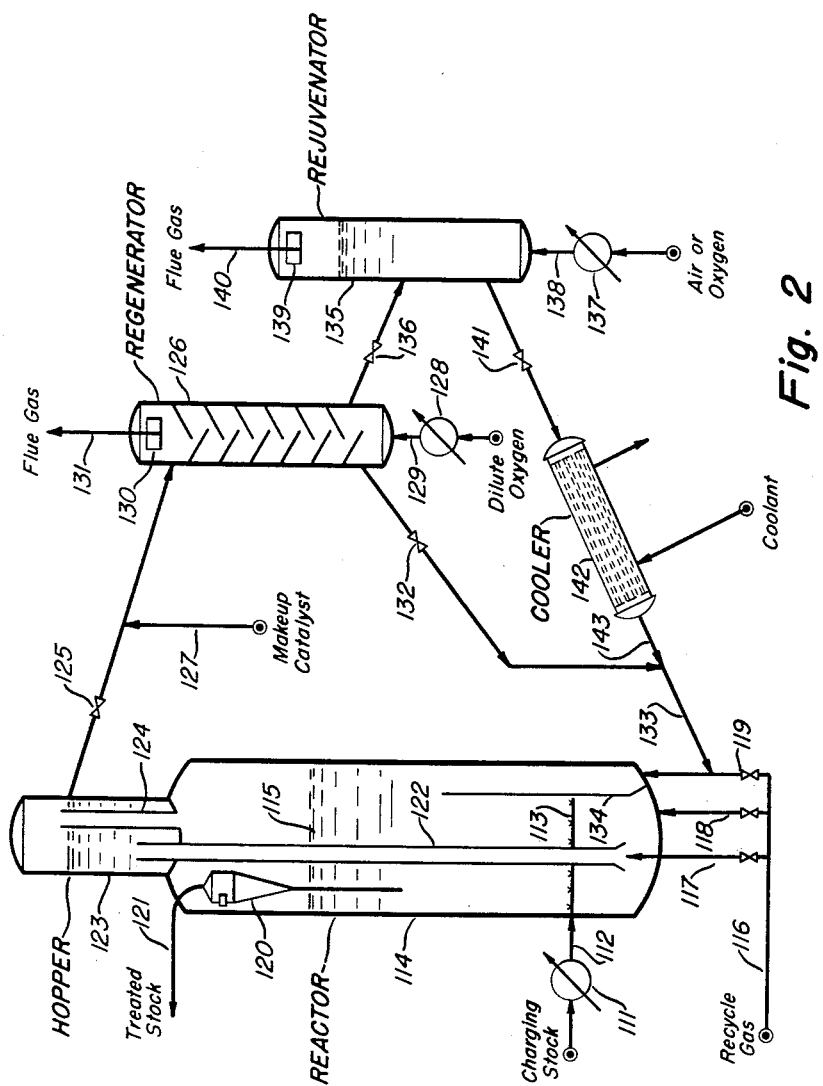

FIGURE 2 illustrates an embodiment of my invention employing a fluidized-catalyst system. A charging stock is vaporized in heater 111 and introduced through line 112 and sparger or grating 113 into a lower part of reactor 114. The reactor is charged with finely divided catalyst 115 of such particle size as to permit satisfactory fluidization, suitably distributed in the range of 1 to 200 microns. The catalyst may suitably be platinum-alumina, palladium-alumina, platinum-titania-alumina, or the like, as described elsewhere herein. The catalyst is fluidized by means of the vaporized charging stock and by means of recycle gas, predominantly hydrogen, introduced into the reactor through line 116 and valved lines 117, 118, and 119, the gas in said line 117 functioning primarily to transfer catalyst from the reactor to an overhead hopper, referred to hereinafter. The recycle gas also serves to strip hydrocarbons from the catalyst in the lower part of the reactor, prior to withdrawal of the catalyst for regeneration. The hydroforming reaction is carried out at a temperature between about 850 and 1000° F., a pressure between about 50 and 1000 pounds per square inch, preferably between about 125 and 250 pounds per square inch, a hydrogen rate of 2,000 to 10,000 standard cubic feet per barrel of charging stock, an hourly weight-space velocity of 1 to 10, a catalyst-to-oil ratio between about 0.05 and 0.5, and an average holding time for the catalyst within the reactor between about 0.1 to 10 hours, preferably 0.2 to 2 hours. The vaporous reaction products pass from the reactor through cyclone system 120 and line 121 to a conventional recovery system (not illustrated), an important feature of which is the separation and return of the product gas (largely hydrogen) as recycle gas through line 116.

Catalyst is withdrawn continuously from reactor 114 at a rate adjusted to give the desired holding time in the reactor, to keep the catalyst activity and selectivity at the desired level, and to produce an average coke level on the catalyst particles ordinarily in excess of 0.1 percent by weight but preferably less than about 2 percent. Withdrawal is effected by gas-lift from the bottom of the reactor, employing a stream of recycle gas which flows through line 117 into the bottom of riser 122 and upward, carrying with it a quantity of catalyst into hopper 123. Within the hopper the catalyst is disengaged, and the gas stream is led through downcomer 124 to the free space at the top of the reactor.

The withdrawn catalyst overflows from hopper 123 through valved line 125 into regenerator 126, makeup catalyst being added as required through line 127. The regenerator is preferably a cascade-type plate column, so that a countercurrent contact between catalyst and oxidizing gas can be achieved, avoiding any substantial intermixing of treated and untreated catalyst within the regenerator, and permitting the withdrawal of catalyst containing a minimum of carbon from the bottom. Within regenerator 126, the catalyst flows downward countercurrent to a stream of dilute oxygen at a temperature between about 825 and 1000° F., a contact time between about 0.5 and 10 minutes, and a total pressure, as a matter of operating convenience and economy, approximately the same as in reactor 114, between about 50 and 1000 pounds per square inch. The regenerating gas, introduced through heater 128 and line 129, is flue gas containing a small controlled proportion of oxygen, suitably around 2 percent. The temperature within regenerator 126 may be maintained within the desired limits by appropriate regulation of the regeneration gas temperature, rate, and oxygen concentration. Heat can be withdrawn from regenerator 126 if desired, suitably by an internally mounted waste-heat boiler, not shown. Flue-gas leaves the regenerator through ceramic filters 130 and line 131. The treated catalyst, ordinarily containing less than about 0.05 percent by weight of residual carbon, emerges in part from a lower portion of regenerator 126 through valved line 132, and is recycled through lines 133 and 119 to reactor 114. The recycled catalyst is introduced into a lower portion of the reactor, segregated by baffle 134, wherein it is fluidized and reduced by recycle gas flowing through line 119, and is commingled thereby with the main body of the catalyst within the reactor. Baffle 134 may be extended if desired to the top of the dense-phase catalyst bed, or an equivalent internal or external conduit may be substituted therefor.

On continued use, as hereinbefore pointed out, the catalyst gradually loses activity and selectivity, even though subjected to the regeneration conditions employed in regenerator 126, owing, I suggest, to the gradual build-up of difficultly removable carbon, and to the annealing and destruction of the catalytic metal crystallites. These effects are overcome and the catalyst is maintained at more nearly constant activity by diverting a portion of the treated catalyst from regenerator 126 to rejuvenator 135, where it is subjected to an oxygen soak at elevated temperature. For this purpose, a portion of the treated catalyst from regenerator 126 is withdrawn through valved line 136 to rejuvenator 135. The proportion of catalyst thus withdrawn ordinarily ranges from about 1 to 20 percent of the carbon-depleted catalyst; but it is desirable at times to send the entire stream of catalyst from the carbon burn-off operation to the oxygen-soak operation, especially when treating charging stocks which give rise to excessive coke formation or which otherwise cause severe deactivation of the catalyst. Rejuvenator 135 may be a conventional unit containing a single bed of fluidized solids, or it may be a cascade-type plate column, or the like. Within the rejuvenator, the catalyst is subjected to a temperature of 950 to 1300° F., preferably between about 1000 and 1200° F., a pressure approximately the same as in regenerator 126 (50 to 1000 pounds per equare inch), an oxygen partial pressure of about 0.4 to 10 atmospheres, and an average holding time between about 0.1 and 36 hours, preferably 1 to 4 hours, varying inversely with the temperature employed. The temperature may be regulated as in regenerator 126, described above. Provision may be made, if desired, for externally recycling the catalyst from the bottom to the top of the rejuvenator. The oxygen-containing gas enters the bottom of rejuvenator 135 through heater 137 and line 138. This gas is air or oxygen, or air enriched with oxygen, and a hydrocarbon or other combustible vapor may be added if desired as a supplemental heat source. Rejuvenation gas leaves the rejuvenator through ceramic filters 139 and line 140. The rejuvenated catalyst, ordinarily containing less than about 0.01 percent carbon, emerges from a lower portion of rejuvenator 135 through valved line 141 to cooler 142, where its temperature can be adjusted, if desired, by indirect heat exchange with a coolant liquid or gas. The catalyst is then recycled through lines 143, 133, and 119 to reactor 114.

While FIGURES 1 and 2 describe the application of my rejuvenation process to the treatment of fixed-bed and fluidized catalysts, it will be apparent that the process is equally applicable to the rejuvenation of other forms of catalysts, of the type herein referred to, employed in other types of catalytic apparatus. For example, the catalyst can be used in the form of a moving bed, in which the charging stock and catalyst are ordinarily passed in parallel flow during the hydroforming operation, and the exhausted catalyst is withdrawn and subjected to a carbon burn-off and an oxygen soak according to my technique, preferably also in a moving bed. In the regeneration operations, the catalyst suitably passes downward through an elongated treating zone while an oxygen-containing gas flows countercurrently upward. The said gas is introduced into the bottom of the treating zone at a temperature and oxygen partial pressure suitable for the oxygen-soaking operation. As the gas flows upward, it ultimately encounters carbonized catalyst; at or below this point, flue-gas or other inert gas of lower temperature is introduced with the stream to adjust the temperature and oxygen concentration to the levels preferred in the carbon burn-off operation. Flue-gas emerges overhead, and rejuvenated catalyst emerges below. Alternatively, the catalyst and oxygen-containing gases may move in parallel flow. Other alternative and modified techniques will be apparent to those skilled in the art.

My process is applicable broadly to the rejuvenation of hydroforming catalysts containing platinum or palladium as the essential component thereof. Such catalysts are generally supported upon or commingled with a base consisting essentially of alumina, silica-alumina, or alumina plus a third component such as a fluoride, a chloride, boria, titania, chromia, an oxide of phosphorus, vanadia, or the like. The platinum is commonly employed in a proportion between about 0.1 and 1 percent by weight, based on dry $Al_2O_3$, preferably about 0.6 percent. Additional components, such as those of the group set forth above, are commonly employed in the proportion of about 0.1 to 10 percent by weight, based on dry $Al_2O_3$.

In the preparation of a typical hydroforming catalyst which, after being deactivated and carbonized during exposure to a hydrocarbon charging stock under hydroforming conditions, is capable of being rejuvenated according to my process, a composite of platinum and alumina is prepared by co-gelling, for example, or by impregnating alumina with a platinum solution or suspension, or by depositing platinum on the surface of alumina particles or pellets. The alumina can be employed in any of a large variety of forms, such as alumina hydrosol, alumina hydrogel, alumina xerogel, alumina monohydrate, sintered alumina, and the like, all of which can be prepared according to methods described in the prior art. The alumina should preferably be of the gamma type in substantially pure form, and in particular should not include iron, manganese, molybdenum, nickel, cobalt, sodium, other alkali metals, or compounds thereof. The platinum is employed in the form of a platinum compound such as chloroplatinic acid, platinum tetrachloride, or the like, or a solution thereof, or preferably a stable colloidal suspension of a platinum sulfide, prepared, for example, by commingling aqueous ammonium polysulfide with aqueous chloroplatinic acid. To the catalytic composite may optionally be added a third component of the group set forth above, or a substance affording such a component under the conditions employed in the catalyst preparation. The mixture of catalyst components is optionally dried in part, suitably at a temperature between about 200 and 400° F. for a period between about 4 and 24 hours, and is then calcined at a temperature between about 800 and 1200° F. for around 2 to 8 hours or more. Alternatively, the catalytic mixture can be contacted with hydrogen or a hydrogen-containing gas at a temperature between about 300 and 600° F. for about 4 to 12 hours or more prior to the said calcining step, or the calcining step itself can be carried out in the presence of hydrogen or a hydrogen-containing gas. As a further alternative, the effect of the calcining treatment can be achieved during the utilization of the catalyst at elevated temperature and pressure in the hydroforming of hydrocarbons.

Hydroforming catalysts of the above type can be prepared in any of the various mechanical forms required by various types of hydroforming processes. Either before or after calcination, the catalyst can be broken into lumps or granules, or it can be ground into a fine powder, suitable for use in the suspensoid or fluidized-solids processes. Or it can be formed into pills, pellets, or other suitable shapes, preferably prior to the calcination step. In this case, the partially dried catalytic mixture is ground to a powder, preferably small enough to pass through a 30-mesh screen, a suitable lubricant is added, such as stearic acid, rosin, hydrogenated coconut oil, graphite, or the like, and the mixture is shaped by extrusion, compression in a pilling machine, or otherwise according to methods well known in the art. Pills having dimensions ranging from about ⅛" x ⅛" to ½" x ½" are highly satisfactory for most purposes. The shaped masses can then be hydrogen-treated and/or calcined, as set forth above.

My invention will be more fully understood from the following specific examples:

EXAMPLE I

Four kilograms of $AlCl_3.6H_2O$ were dissolved in 25 liters of distilled water, and the resulting solution was adjusted to pH 8 by stirring and adding a sufficient quantity of aqueous 10 percent ammonium hydroxide. A precipitate of aluminum hydroxide was formed thereby, and was separated from the aqueous liquor by filtration. The precipitate was washed by slurrying six times in 21-liter portions of distilled water at 150° F. The resulting salt-free solid was suspended in 11 liters of distilled water, and the suspension was divided into six aliquot parts, each of which contained 141 grams of $Al_2O_3$.

Titanium tetrachloride (0.83 gram) was dissolved and hydrolyzed in distilled water to form a slurry of titanium hydroxide.

A suspension of platinum sulfide was prepared by adding two milliliters of aqueous ammonium polysulfide to 112 milliliters of an aqueous solution of platinum chloride containing 0.845 gram of platinum.

The titanium hydroxide slurry was commingled with one of the aliquot portions of the alumina suspension, the platinum sulfide suspension was added thereto, and the resulting mixture was dried overnight at 185° F., then further dried at 350° F. The resulting cake was ground to pass 30-mesh, mixed with 4 percent "Sterotex" (a hydrogenated coconut oil), formed into ⅛-inch pellets, and calcined in air at 900° F. for about 4 hours. The completed catalyst contained 0.25 percent by weight $TiO_2$ and 0.6 percent platinum, based on dry $Al_2O_3$.

A portion of the catalyst was used in a cyclic, regenerative process for hydroforming a Mid-Continent virgin naphtha having the following inspections:

Boiling range, ASTM:
| | | |
|---|---|---|
| Initial | °F | 200 |
| 10% | °F | 237 |
| 50% | °F | 272 |
| 90% | °F | 313 |
| End point | °F | 360 |
| Octane number, CFR–R | | 44 |
| Sulfur content (lamp) | percent | 0.03 |
| Gravity, API | | 56.5 |
| Reid vapor pressure | p.s.i. | 1.8 |
| Bromine number | | 1.4 |

Composition:
| | | |
|---|---|---|
| Naphthenes | percent | 40 |
| Paraffins | do | 52 |
| Aromatics | do | 8 |

The cyclic process involved alternate exposure of the naphtha to the catalyst for approximately twenty hours at 933° F., 200 pounds per square inch gage, a liquid hourly space velocity of 2, and a once-through hydrogen rate of 5,000 cubic feet per barrel of feed, and a subsequent reactivation by mild oxidation and hydrogenation. During the first 20-hour on-stream period, the total $C_5$–400° F. product had a CFR–R octane number of 96. At the end of each on-stream period, the flow of charging stock and hydrogen was stopped, the reactor pressure was reduced to atmospheric, the reactor was purged with nitrogen, and the catalyst was contacted with a 2 percent mixture of oxygen in nitrogen at about 850° F. until carbon dioxide substantially disappeared from the flue-gas. The reactor was again purged with nitrogen, and the catalyst was reduced by contact with hydrogen for three hours, the temperature and pressure being meanwhile gradually raised to the hydroforming level. A new cycle of hydroforming and regeneration was then started.

During fifty of the foregoing cycles, the catalyst was observed to decline in activity at the rate of 2.6 octane numbers per 1,000 hours. During hour 1261–1281 (Cycle 56), the catalyst produced a 91.6 CFR–R octane number product in a yield of 81.7 volume-percent under the defined conditions.

At the end of Cycle 56 (1281 hours on stream), the catalyst which had a carbon content of approximately 1.7 weight percent was regenerated by mild oxidation as in the previous cycles. This regeneration did not remove all of the carbon from the catalyst and the catalyst was thereafter treated for 3 hours with air at about 825 to 1080° F. and was then treated with pure oxygen at 1065 to 1080° F. for 24 hours in a flow system. The resulting oxidized catalyst was cooled rapidly to room temperature by passing air over the catalyst, reheated and reduced with hydrogen at 825° F., and again tested for twenty hours in the hydroforming operation (Cycle 57). A $C_5$–400° F. product was obtained having a CFR–R octane number of 95.4, substantially as good as the product obtained with the original catalyst.

The catalyst from Cycle 57 was mildly oxidized, contacted with pure oxygen at 1080° F. for twenty-four hours, and returned to hydroforming service under the previously employed operating conditions for an on-stream period of 160 hours (Cycle 58, hours 1301–1461). The product gasoline produced in the first 20-hour period had a CFR–R octane number of 95.2 and the product yields were substantially higher than were obtained prior to the use of rejuvenation.

EXAMPLE II

Catalyst preparation

Four kilograms of $AlCl_3 \cdot 6H_2O$ were dissolved in 25 liters of distilled water, and the resulting solution was adjusted to pH 8 by stirring and adding a sufficient quantity of aqueous 10 percent ammonium hydroxide. A precipitate of aluminum hydroxide was formed thereby, and was separated from the aqueous liquor by filtration. The precipitate was washed by slurrying six times in 21-liter portions of distilled water at 150° F., and the resulting salt-free solid, comprising 845 grams of $Al_2O_3$, was suspended in 11 liters of distilled water.

A platinum sulfide solution was prepared by adding 12 milliliters of aqueous ammonium polysulfide to 672 milliliters of an aqueous solution of platinum chloride containing 5.07 grams of platinum.

The platinum sulfide solution was commingled with the alumina suspension, and the resulting mixture was dried overnight at 185° F., then further dried at 350° F. The resulting cake was ground to pass 30-mesh, mixed with 4 percent "Sterotex" (a hydrogenated coconut oil), formed into ⅛-inch pellets, and calcined in air at 900° F. for about 4 hours. The completed catalyst contained 0.6 percent platinum, based on dry $Al_2O_3$. The catalyst in this condition is hereinafter referred to for convenience as the "original" catalyst.

Life test

A portion of the original catalyst was subjected to a life test involving alternate exposure to charging stock under hydroforming conditions for twenty hours and subsequent regeneration by oxidation and hydrogenation. In the hydroforming stage, the Mid-Continent virgin naphtha described in Example I was contacted at 840 to 960° F., 200 pounds per square inch gage, 2 liquid hourly space velocity, and 5,000 cubic feet of recycle gas per barrel of feed. After approximately 20 hours on stream, the flow of oil and hydrogen was stopped, the reactor pressure was reduced to atmospheric, the reactor was purged with nitrogen, and the catalyst was regenerated by contact with a 2 percent mixture of oxygen in nitrogen at 850° F. until the $CO_2$ content of the flue-gas fell below 0.1 percent. The reactor was again purged with nitrogen, and the catalyst was reduced by contact with hydrogen for three hours, the temperature and pressure being meanwhile gradually raised to the hydroforming level. The steps of hydroforming and regeneration were then cyclically repeated.

After 253 hours on stream and 14 regenerations, the resulting used catalyst was withdrawn from the reactor and divided into portions for various tests.

Activity of used catalyst

A first portion of the used catalyst was subjected to regeneration by mild oxidation as in the fourteen previous regenerations. It was then returned to a hydroforming operation at a catalyst temperature of 920° F., the other conditions being the same as those employed in the life test described above, and the hydroforming operation was continued without regeneration for 159 hours to measure the activity and selectivity maintenance of the catalyst. The results were as follows:

| Product Interval, hr. | Octane No., CFR–R | Yield $C_5$–400° F., vol.-percent |
| --- | --- | --- |
| 0–22 | 90.4 | 82.7 |
| 22–43 | 88.8 | 82.0 |
| 43–62 | 83.9 | 84.3 |
| 62–82 | 79.0 | 84.7 |
| 82–102 | 73.0 | 85.5 |
| 102–121 | 67.3 | 85.9 |
| 121–140 | 65.0 | 86.7 |
| 140–159 | 63.2 | 87.0 |

Rejuvenation in oxygen

A second portion of the used catalyst was subjected to regeneration by mild oxidation as in the fourteen previous regenerations, and was then treated with pure oxygen at 1060–1080° F. and 200 pounds per square inch gage for 24 hours. The resulting oxidized catalyst was cooled to 850° F. over a period of 3 hours, and was then reduced in hydrogen at 850° F. The treated catalyst, when the hydroforming operation was resumed at a catalyst temperature of 940° F., yielded a $C_5$–400° F. product having an octane number of 97.

Rejuvenation and quench

A third portion of the used catalyst was subjected to regeneration by mild oxidation as in the fourteen previous regenerations, and was then subjected to a severe oxidation by treatment at 1060–1080° F. with pure oxygen at atmospheric pressure for 24 hours. The resulting oxidized catalyst was quenched to room temperature in around 5 minutes, and was then reheated and reduced in hydrogen at 850° F. The treated catalyst, when the hydroforming operation was resumed at a catalyst temperature of 920° F., gave the following results:

| Product Interval, hr. | Octane No., CFR-R | Yield C$_5$-400° F., vol.-percent |
|---|---|---|
| 0-20 | 94.6 | 83.2 |
| 20-41 | 94.6 | 85.6 |
| 41-61 | 93.4 | |
| 61-83 | 93.4 | |
| 83-103 | 92.5 | 83.5 |
| 103-123 | 91.9 | 84.5 |
| 123-143 | 91.6 | |

A fourth portion of the used catalyst was subjected to regeneration, rejuvenation in oxygen, quench, and reduction according to the same procedure and under the same conditions, and was thereafter tested in the described hydroforming operation at a higher catalyst temperature of 940° F. The results were as follows:

| Product Interval, hr. | Octane No., CFR-R | Yield C$_5$-400° F., vol.-percent |
|---|---|---|
| 0-20 | 100.0 | 80.2 |
| 20-40 | 100.5 | 80.4 |
| 40-60 | 98.5 | 78.8 |
| 60-80 | 98.1 | 81.2 |
| 80-100 | 95.3 | 79.1 |
| 100-120 | 97.5 | |

EXAMPLE III

An alumina hydrosol weighing 46.7 kilograms and containing 4.68 percent by weight of $Al_2O_3$ was prepared by amalgamating a sufficient quantity of highly purified aluminum metal and reacting the amalgamated aluminum with dilute aqueous acetic acid according to the technique described by Heard in Reissue Patent 22,196 (October 6, 1942). An aqueous chloroplatinic acid solution measuring 5.728 liters and containing the equivalent of 13.16 grams of platinum was commingled with 15 milliliters of aqueous 23 percent ammonium polysulfide, and a clear, stable liquid was obtained thereby, presumably a colloidal solution of a platinum sulfide. The platinum solution was added with stirring to the alumina hydrosol, and the mixture was dried overnight in a steam oven, further dried for 4 hours at 350° F., and calcined in air at 950° F. for 24 hours. The dried material was crushed to a fine powder, commingled with a small proportion of Sterotex as a lubricant, and formed into ⅛-inch pellets. The pellets were finally calcined in air at 900° F. for 6 hours.

A portion of the completed catalyst, containing 0.6 percent platinum based on dry $Al_2O_3$, was tested in the hydroforming of the Mid-Continent naphtha described in Example I at 200 pounds per square inch gage, 2 hourly weight space velocity, 5,000 cubic feet of hydrogen per barrel of feed, and under near-isothermal conditions, the temperature of the metallic block surrounding the reaction tube being held at 940° F. The results were as follows:

Product interval, hour:     Octane No., CFR-R
0-20 _____ 91.1
20-40 _____ 90.5
40-60 _____ 90.3
60-80 _____ 89.3
80-100 _____ 88.7

Another portion of the completed catalyst was used in four cyclic hydroforming runs for a total time of 926 hours on stream. In each run, the Mid-Continent naphtha described in Example I was contacted with the catalyst under typical hydroforming conditions, and the four runs were separated by periods of mild regeneration in which the used catalyst was contacted with 2 percent oxygen in nitrogen at 825-850° F. and atmospheric pressure for approximately twenty-four hours, the carbon being nearly completely removed from the catalyst thereby.

The used catalyst from the fourth run, containing 0.5 percent carbon, was divided into aliquots, and two of the aliquots were mildly regenerated by contact with 2 percent oxygen in nitrogen at 850° F. and 1 atmosphere for twenty-four hours. Then each of the regenerated aliquots was separately returned to on-stream hydroforming conditions for an activity test, the reactor block temperature being fixed at approximately 940° F. in one case and 960° F. in the other. The results were as follows:

| Product Interval, hr. | Octane No., CFR-R | |
|---|---|---|
| | 940° F. Block Temp. | 960° F. Block Temp. |
| 0-20 | 85.9 | 92.3 |
| 20-40 | 74.8 | 89.7 |
| 40-60 | 64.6 | 86.9 |
| 60-80 | 61.8 | |
| 80-100 | 61.4 | |

Another aliquot of the used catalyst from the fourth run, described above, was mildly regenerated at a block temperature of 830° F. by exposure to air at one atmosphere for 2 hours and to oxygen at one atmosphere for 6 hours, and was then rejuvenated by exposure to oxygen at one atmosphere for 12 hours at a block temperature of 1100° F. Thereafter it was rapidly cooled below 850° F., and was returned to on-stream hydroforming conditions at a reactor block temperature of 960° F. The results indicated that this reactivation procedure produced a striking improvement in catalyst activity and stability:

Product interval, hr.:     Octane No., CFR-R
0-20 _____ 95.3
20-40 _____ 94.7
40-60 _____ 94.8
60-80 _____ 94.2
80-100 _____ 94.0
100-120 _____ 94.1
120-140 _____ 93.6

EXAMPLE IV

Catalyst preparation

A Heard-type alumina hydrosol weighing 91 pounds and containing 5.67 percent by weight of $Al_2O_3$ was prepared from pure, amalgamated aluminum metal and aqueous 2 percent acetic acid. An aqueous platinum solution was prepared by dissolving 39.4 grams of $H_2PtCl_6 \cdot 6H_2O$ in 15 liters of water and adding thereto 15 milliliters of aqueous 23 percent ammonium polysulfide. The platinum solution was added to the alumina hydrosol with stirring, and the mixture was dried overnight in a steam oven, further dried for 4 hours at 350° F., and calcined in air at 950° F. for 3 hours. The dried material was crushed to a fine powder, commingled with 4 percent of Sterotex as a lubricant, and formed into ⅛-inch pellets. The pellets were finally calcined in air at 1100° F. for 6 hours. The completed catalyst contained 0.6 percent by weight of platinum, based on dry $Al_2O_3$.

Activity test

The completed catalyst was subjected to a standard hydroforming test on the Mid-Continent virgin naphtha described in Example I at a reactor block temperature of 960° F., a pressure of 200 pounds per square inch gage, a liquid hourly space velocity of 2, and 5,000 cubic feet of hydrogen per barrel of feed. The results were as follows:

| Product interval, hr.: | Octane No., CFR-R |
|---|---|
| 0–20 | 99.1 |
| 20–40 | 98.2 |
| 40–60 | 95.3 |
| 60–80 | 95.2 |
| 80–100 | 96.1 |
| 100–120 | 95.5 |
| 120–140 | 95.1 |
| 140–180 | 93.9 |

*Helium deactivation, followed by rejuvenation*

As a means of rapidly producing a deactivated catalyst, another portion of the original catalyst was heated at 1400° F. for 24 hours in helium at one atmosphere, and was then subjected to an activity test under the hydroforming conditions described above. The results were as follows:

| Product interval, hr.: | Octane No., CFR-R |
|---|---|
| 0–20 | 71.1 |
| 20–40 | 64.6 |

The catalyst was removed from on-stream conditions, mildly oxidized at 830° F. reactor block temperature with oxygen at one atmosphere for 6 hours, soaked at 1100° block temperature in oxygen at one atmosphere for 12 hours, and quenched below 850° F. The treated catalyst was subjected to a hydroforming test at a reactor block temperature of 940° F., the other conditions being the same as those employed in the test on the original catalyst. The results were as follows:

| Product interval, hr.: | Octane No., CFR-R |
|---|---|
| 0–20 | 97.9 |
| 20–40 | 97.1 |
| 40–60 | 95.7 |
| 60–80 | 94.8 |
| 80–100 | 94.2 |
| 100–120 | 93.4 |
| 120–140 | 92.1 |

The catalyst was again removed from on-stream conditions, mildly oxidized at 830° F. block temperature in air at one atmosphere for 2 hours and in oxygen at one atmosphere for 6 hours, and soaked in helium at 1400° F. and one atmosphere for 24 hours. A standard hydroforming test at 960° F. block temperature gave the following results:

| Product interval, hr.: | Octane No., CFR-R |
|---|---|
| 0–20 | 83.0 |
| 20–40 | 73.2 |
| 40–60 | 66.6 |

Once again the catalyst was removed from on-stream conditions, mildly oxidized at 825° F. block temperature in air at one atmosphere for 6 hours, soaked at 1100° F. block temperature in oxygen at one atmosphere for 12 hours, and quenched below 850° F. The treated catalyst gave the following results in the standard hydroforming test at 960° F. block temperature:

| Product interval, hr.: | Octane No., CFR-R |
|---|---|
| 0–20 | 96.3 |
| 20–40 | 95.3 |
| 40–60 | 95.8 |
| 60–80 | 94.5 |
| 80–100 | 93.4 |
| 100–120 | 93.7 |

*Tests demonstrating necessity of employing defined rejuvenation conditions*

Tests were carried out on a platinum-alumina catalyst containing 0.6 percent by weight of platinum which had been severely deactivated by eleven cycles of use in the hydroforming of a Mid-Continent naphtha feed stock at temperatures of 880 to 950° F., pressures of 200 to 300 pounds per square inch gage, liquid hourly space velocities between 0.65 and 2.5, and a hydrogen rate of 4,000 standard cubic feet per barrel. After each of the first ten cycles, the catalyst was mildly oxidized to remove carbon with a 2 percent mixture of oxygen in nitrogen at one atmosphere and a maximum flame-front temperature around 830° F. in a bed which otherwise ranged in temperature from about 725 to 800° F.

After the eleventh hydroforming cycle, an aliquot of the deactivated catalyst, containing 3.36 percent by weight of coke, was subjected to a standard hydroforming activity test on a Mid-Continent virgin naphtha having the following inspections:

ASTM distillation:
| | |
|---|---|
| IBP | ° F__ 199 |
| 10% | ° F__ 234 |
| 30% | ° F__ 257 |
| 50% | ° F__ 277 |
| 70% | ° F__ 299 |
| 90% | ° F__ 326 |
| Max. | ° F__ 359 |

| | |
|---|---|
| Gravity, ° API | 55.7 |
| Reid vap. press., p.s.i | 1.5 |
| Sulfur, wt.-percent | 0.021 |
| Bromine No | 0.7 |
| Nitrogen, p.p.m | 4.5 |
| Water, p.p.m | 77 |
| Chloride, p.p.m | 2.7 |
| Paraffins, vol.-percent | 48.5 |
| Olefins | Trace |
| Naphthenes, vol.-percent | 44.0 |
| Aromatics, vol.-percent | 7.5 |

The term "activity" is employed in connection with these tests to mean the number of volumes of arbitrarily chosen standard catalyst that would be required to accomplish the same result as 100 volumes of the catalyst under test when employed with the same charge and under equivalent conditions of temperature, pressure and space velocity in the various treating periods. This enables corrections for minor deviations from prescribed test conditions and provides a more accurate basis for comparison than uncorrected product octane numbers. Usually, the reformate is collected at the end of a 5 hour on-stream period and at the end of each 20-hour period thereafter for a total period of 105 hours, the activity of the catalyst being determined for each 20-hour period.

When the deactivated coke-containing catalyst after the eleventh hydroforming cycle was tested (Test A) with the defined Mid-Continent virgin naphtha at 930° F. catalyst outlet temperature, 200 pounds per square inch gage, 2 liquid volumes of charge per hour per volume of catalyst space and 5,000 standard cubic feet of once-through hydrogen per barrel of charging stock, the catalyst in each of the 20-hour periods of the 105 hour total test period was found to have an activity of less than 15. In other words, 15 volumes of the arbitrarily chosen standard catalyst would accomplish the same result as 100 volumes of the deactivated catalyst after it had been employed for on-stream hydroforming and subjected to regeneration in eleven cycles.

For comparison, data obtained with a sample of the original, unused platinum-alumina catalyst are presented in Test B. The catalyst was subjected to an activity test under the same conditions and according to the same procedure, except that the reformate was first sampled after 20 hours on stream and at 20-hour intervals thereafter. The results were as follows:

TEST B

| Product interval, hr.: | Fresh catalyst activity |
|---|---|
| 0–20 | 83 |
| 20–40 | 74 |
| 40–60 | 65 |
| 60–80 | 61 |
| 80–100 | 58 |
| 100–120 | 57 |

The deactivated, coke-containing catalyst was then subjected to regeneration by mild oxidation with 2 percent oxygen in nitrogen at one atmosphere (corresponding to an oxygen partial pressure of 0.02 atmosphere) and a maximum flame front temperature of about 830° F., the catalyst bed ranging in temperature at other points from about 725 to 800° F. The carbon content of the catalyst was reduced thereby to 0.04 percent by weight. The carbon-depleted catalyst was divided into aliquots for further tests. One aliquot was subjected to the standard hydroforming activity test, described above, with the results appearing in the table below.

TEST C

| Product interval, hr.: | Regenerated (11th cycle) catalyst activity |
|---|---|
| 0–5 | 49 |
| 5–25 | 30 |
| 25–45 | 19 |
| 45–65 | 17 |
| 65–85 | 14 |
| 85–105 | — |

After about two and one-half days on stream the activity was thus about 17/65 or about one-fourth the activity exhibited by the fresh catalyst under test.

*Effect of oxygen partial pressure.*—Separate aliquots of the carbon-depleted catalyst were soaked for three hours at 1050° F. in air at gage pressures of 0, 22, 60, and 300 pounds per square inch, corresponding respectively to oxygen partial pressures of 0.2, 0.5, 1.02, and 4.3 atmospheres. The air-soaked aliquots were subjected to standard hydroforming activity tests, with the following results:

| Test | C | D | E | F | G |
|---|---|---|---|---|---|
| Temp., °F | | 1,050 | 1,050 | 1,050 | 1,050 |
| Time, hr | | 3 | 3 | 3 | 3 |
| PO₂, atm | | 0.2 | 0.5 | 1.02 | 4.3 |
| Product Interval, hr. | Catalyst Activity Before Treatment | Catalyst Activity After Treatment | Catalyst Activity After Treatment | Catalyst Activity After Treatment | Catalyst Activity After Treatment |
| 0–5 | 49 | 53 | 75 | 124 | 149 |
| 5–25 | 30 | 45 | 73 | 99 | 110 |
| 25–45 | 19 | 40 | 69 | 73 | 104 |
| 45–65 | 17 | 36 | 58 | 68 | 92 |
| 65–85 | 14 | 33 | 59 | 60 | 78 |
| 85–105 | | 34 | | 54 | 57 | 76 |

Thus even at 1050° F. for three hours, ordinary atmospheric air did not restore the deactivated catalyst to the activity of fresh catalyst but with an oxygen partial pressure of .5 atmosphere, the activity of the deactivated catalyst is restored substantially to that of the fresh catalyst.

*Effect of temperature.*—Separate aliquots of the carbon-depleted catalyst were soaked in air at 60 pounds per square inch gage (corresponding to an oxygen partial pressure of 1.02 atmosphere) for three hours at temperatures of 850, 950, 1050, and 1150° F. The treated catalysts were subjected to standard hydroforming activity tests with the following results:

| Test | C | H | J | F | K |
|---|---|---|---|---|---|
| Time, hr | | 3 | 3 | 3 | 3 |
| PO₂, atm | | 1.02 | 1.02 | 1.02 | 1.02 |
| Temp., °F | | 850 | 950 | 1,050 | 1,150 |
| Product Interval, hr. | Catalyst Activity Before Treatment | Catalyst Activity After Treatment | Catalyst Activity After Treatment | Catalyst Activity After Treatment | Catalyst Activity After Treatment |
| 0–5 | 49 | 87 | 90 | 124 | 126 |
| 5–25 | 30 | 69 | 69 | 99 | 99 |
| 25–45 | 19 | 56 | 70 | 73 | 93 |
| 45–65 | 17 | 52 | 65 | 68 | 80 |
| 65–85 | 14 | 44 | 61 | 60 | 62 |
| 85–105 | | 43 | 56 | 57 | 56 |

Thus the 850° F. temperature, even with 1.02 atmospheres O₂ partial pressure did not restore the catalyst to that of fresh catalyst in the periods after the initial period, but this was accomplished at temperatures of 950–1150° F.

*Effect of treating time.*—Separate aliquots of the carbon-depleted catalyst were soaked at 1050° F. in air at 60 pounds per square inch gage (corresponding to an oxygen partial pressure of 1.02 atmosphere) for treating periods of 0.33, 1, and 3 hours. The treated catalysts were subjected to standard hydroforming activity tests with the following results:

| Test | C | L | M | F |
|---|---|---|---|---|
| PO₂, atm | | 1.02 | 1.02 | 1.02 |
| Temp., °F | | 1,050 | 1,050 | 1,050 |
| Time, hr | | 0.33 | 1 | 3 |
| Product Interval, hr. | Catalyst Activity Before Treatment | Catalyst Activity After Treatment | Catalyst Activity After Treatment | Catalyst Activity After Treatment |
| 0–5 | 49 | 94 | 108 | 124 |
| 5–25 | 30 | 69 | 75 | 99 |
| 25–45 | 19 | 55 | 66 | 73 |
| 45–65 | 17 | 58 | 57 | 68 |
| 65–85 | 14 | 50 | 53 | 60 |
| 85–105 | | 50 | 50 | 57 |

The foregoing test results demonstrate that when a platinum catalyst has been employed in a hydroforming operation until its activity is substantially impaired and carbonaceous matter is accumulated thereon, the original activity was not restored by the burning of carbonaceous matter from the catalyst in the regeneration step, it was not restored by treatment for three hours at a temperature even as high as 1050° F. when the oxidizing gas was atmospheric air and it was not fully restored even with an oxygen partial pressure of 1.02 atmospheres when the temperature of the oxidizing step was below 950° F. The test data show that when the catalyst, after the carbon-burning step, was oxidized with a gas having an oxygen partial pressure above .4 atmosphere at a temperature in the range of 950 to 1300° F. for a period of three hours, the activity of the catalyst was fully restored and, in some cases, the activity was superior to that of the freshly prepared catalyst. The high oxygen partial pressures in these tests were obtained by employing air under superatmospheric pressure. The catalyst was reduced by treatment with a hydrogen-containing gas at a temperature in the hydroforming range in all of these tests by employing the oxidized catalyst in the subsequent hydroforming operation for determining its activity.

While I have described my invention with reference to certain specific embodiments thereof, it will be recognized that the said embodiments are illustrative only and not intended to be limitations as to the scope thereof. My invention is applicable broadly to the rejuvenation of platinum and/or palladium-containing hydroforming catalysts.

This application is a continuation-in-part of my applications Serial No. 292,275, filed June 7, 1952, now abandoned, and Serial No. 347,719, filed April 9, 1953, now abandoned.

In accordance with the foregoing description, I claim as my invention:

1. The method of hydroforming naphtha which comprises contacting vapors of said naphtha with free hydrogen in the presence of a platinum-on-alumina type hydroforming catalyst at a pressure between 50 and 350 pounds per square inch gage, a hydrogen partial pressure between 30 and 250 pounds per square inch and a temperature between 850 and 1000° F. until the activity and selectivity of said catalyst are substantially impaired and carbonaceous matter is accumulated thereon, discontinuing contact of the catalyst with the naphtha-hydrogen mixture, purging the catalyst and subjecting it to treatment at a combustion temperature between about 825 and about 1200° F. with a stream of inert gas containing sufficient oxygen to effect combustion of said carbonaceous matter without exceeding said combustion temperature, whereby the carbon content of the catalyst is reduced to less than about 0.1 percent, subjecting the carbon-depleted catalyst under superatmospheric pressure to treatment with a stream of a heated gas mixture of inert gas and oxygen wherein the partial pressure of the oxygen is at least 0.4 atmosphere while maintaining a temperature of from about 950 to about 1200° F. for a period of not less than about 0.1 hour, then contacting the catalyst with hydrogen-containing gas, and again contacting the catalyst with the naphtha-hydrogen mixture under the conditions previously employed for the hydroforming operation.

2. In a cyclic process for reforming a naphtha with a platinum-on-alumina catalyst under low-pressure hydroforming conditions which lead to catalyst deactivation by carbon deposition and physical-chemical changes therein, the improved method of operation which comprises discontinuing the on-stream operation of said catalyst before the stabilized product CFR–R octane number decreases more than four units below its initial level and before the volume-percent yield of stabilized product decreases more than four units below its initial level, then regenerating said catalyst by exposure to oxidative conditions effective to substantially remove the carbon therefrom, subjecting the resulting carbon-depleted catalyst to contact at superatmospheric pressure and at a temperature in the range of about 950 to about 1300° F. with a gas containing oxygen at a partial pressure in the range of about 0.4 to about 10 atmospheres, thereby rejuvenating the catalyst, reducing the catalyst by contact with a hydrogen-containing gas at a temperature within the hydroforming range, and cyclically repeating the hydroforming, regeneration, rejuvenation, and reduction steps.

3. The process of claim 2 wherein said reduction step is effected in the hydroforming zone by contact with hydrogen introduced together with naphtha charging stock into said zone.

4. A moving-bed regenerative hydroforming process which comprises passing a vaporized hydrocarbon charging stock and hydrogen under hydroforming conditions through a reaction zone in contact with a moving bed of a platinum-on-alumina catalyst, whereby said catalyst becomes carbonized and decreases in activity and selectivity; withdrawing said carbonized catalyst from said reaction zone; passing said carbonized catalyst downward through a reactivation zone; passing a reactivating gas containing oxygen at a partial pressure above about 0.4 atmosphere into the bottom of said reactivation zone at a temperature between about 950 and about 1300° F.; passing a diluent gas into an intermediate point of said reactivation zone at a sufficient rate to take up the heat of combustion released therein and to hold the temperature below about 1300° F., whereby said carbonized catalyst is initially subjected to carbon removal by oxidation and is thereafter soaked in oxygen for a time sufficient to restore the initial activity and selectivity thereof; and withdrawing and recycling the resulting rejuvenated catalyst to said reaction zone.

5. In a fluidized, platinum-catalyst, naphtha hydroforming system wherein the platinum catalyst effects hydroforming of naphtha at a temperature in the range of about 850 to 950° F. and a pressure of about 50 to 1000 p.s.i. in the presence of a recycled hydrogen gas stream employed at a rate in the range of 2,000 to 10,000 standard cubic feet per barrel of naphtha charge and with a space velocity of .5 to 5 pounds per hour of naphtha charge per pound of catalyst in a conversion zone wherein catalyst containing carbonaceous deposits is continuously withdrawn from the conversion zone to a regeneration zone and therein regenerated with a gas stream having an oxygen content between about .5 and 20 percent at a temperature in the range of 750 to 900° F. effective for burning carbonaceous deposits at approximately the same pressure as the pressure in the conversion zone, wherein the regenerated catalyst from the regeneration zone is continuously returned to the conversion zone and wherein on continued use the catalyst would normally lose activity and selectivity and difficultly removable carbon becomes accumulated thereon, the improvement which comprises withdrawing at least a part of the catalyst from the regeneration zone to a separate fluidized treating zone, further treating said catalyst by oxidizing its platinum with air in said treating zone at a pressure in the range of about 50 to 1,000 p.s.i. and at a temperature in the range of about 950 to 1300° F. and for a time in the range of .1 to 36 hours, and returning catalyst from the treating zone back to the conversion zone whereby the platinum is reduced with hydrogen at a temperature above 600° F., the normal loss of activity and selectivity is substantially prevented and the catalyst in the conversion zone is maintained at substantially constant activity.

6. A process for regenerating a platinum-containing hydroforming catalyst, said catalyst having become deactivated during exposure to a hydrocarbon charging stock under hydroforming conditions, and containing not more than about 0.1 percent by weight of carbon deposited thereon, which comprises contacting said catalyst under a pressure in the range of 50 to 1,000 p.s.i at a temperature between about 950 and 1300° F. with an oxidizing gas containing at least about 20 percent by volume of oxygen, whereby said carbon is removed therefrom and a substantial proportion of the platinum contained therein is converted to a platinum oxide, and thereafter contacting said catalyst with a hydrogen-containing gas at a temperature within the hydroforming range.

7. The method of restoring activity of a platinum hydroforming catalyst which has become substantially deactivated and coated with carbon, which method comprises subjecting said deactivated and carbon-coated catalyst to a mild oxidation at an average bed temperature not substantially higher than 900° F. with dilute oxygen to remove the readily oxidizable carbon therefrom and to reduce the carbon content thereof to an amount below about .1 percent, then treating the catalyst which contains only residual carbon by heating it to a temperature in the range of about 950 to 1300° F. and oxidizing it in said temperature range at a superatmospheric pressure in the range of 50 to 1,000 p.s.i. with a gas having an oxygen partial pressure substantially higher than that of air at atmospheric pressure for a period of time to remove residual oxidizable carbon and to convert a substantial amount of the platinum into an oxide form, and subsequently reducing the oxidized platinum with a hydrogen-containing gas at a temperature of about 600 to 1,000° F. back to its catalytically active form whereby the catalyst is restored to substantially the original activity and selectivety thereof and to substantially its initial capacity for maintaining its activity and selectivity during contact with charging stock under hydroforming conditions.

8. The method of claim 7 wherein the oxygen-containing gas employed in the treating step is air.

9. The method of claim 7 wherein the oxygen-containing gas employed in the treating step is air diluted with an inert gas.

10. The method of claim 7 wherein at least 10 percent of the platinum is converted into an oxide form in the treating step.

11. The method of claim 7 wherein the catalyst contains at least .1 percent of a halide selected from the class consisting of fluoride and chloride.

12. In a platinum catalyst naphtha hydroforming system wherein the platinum catalyst, during many repeated cycles of naphtha conversion under hydroforming conditions and regeneration under carbon-burning conditions, would in the absence of further treatment gradually lose activity and selectivity, the method of further treating the catalyst which has become deactivated and which contains carbonaceous deposits formed during naphtha conversion, after the carbon content thereof has been substantially reduced by burning readily combustible carbonaceous deposits with dilute oxygen at an average bed temperature not substantially exceeding about 900° F. in a regeneration step, which method comprises oxidizing said deactivated catalyst at a superatmospheric pressure with a gas having a sufficiently high oxygen partial pressure which is substantially higher than that of atmospheric air at a sufficiently high temperature in the range of about 950 to 1300° F. and for a time period of at least .1 hour and subsequently contacting the catalyst with hydrogen at a temperature above 600° F. whereby the treating steps overcome the loss of activity and selectivity which would be encountered from cycle to cycle in the absence of said steps.

13. The method of claim 12 wherein the oxidizing step is effected at a superatmospheric pressure of at least 50 p.s.i. with a gas having an oxygen partial pressure at least that of air at 50 p.s.i.

14. In a platinum catalyst naphtha hydroforming system wherein the platinum catalyst, during repeated cycles of naphtha conversion under hydroforming conditions and regeneration under carbon-burning conditions, gradually loses activity and selectivity in the absence of further treatment, the method of overcoming such loss which method comprises further treating carbon-containing deactivated catalysts, after the carbon content thereof has been reduced to less than about .1 percent by burning readily combustible carbonaceous deposits with dilute oxygen at an average bed temperature not substantially exceeding about 900° F. in a regeneration step, by contacting the catalyst at superatmospheric pressure with a gas reactable with the platinum to convert at least a part of said platinum to a compound of less density and higher state of oxidation, and then reconverting the platinum compound to platinum in its originally active state by reduction with hydrogen at a temperature above 600° F. which is sufficient to effect such reconversion.

15. In a platinum catalyst naphtha hydroforming system wherein the platinum catalyst, during many repeated cycles of naphtha conversion under hydroforming conditions and regeneration under carbon burning conditions, would in the absence of further treatment gradually lose activity and selectivity, the method of further treating the catalyst after regeneration thereof which method comprises the step of oxidizing the regenerated catalyst with a gas having an oxygen partial pressure of at least about .4 atmosphere at a temperature in the range of about 950 to 1300° F. for a time of about .1 to 36 hours sufficient substantially to overcome the loss of activity and selectivity which would be encountered in the absence of said oxidizing step.

16. The method of claim 15 wherein the platinum catalyst is employed in an essentially adiabatic fixed bed system and wherein regeneration is effected by combustion with a stream of inert gas containing about .5 to 2 percent by volume of oxygen and wherein the flow rate of said oxygen-containing inert gas is regulated to remove heat resulting from combustion of carbonaceous deposits formed during naphtha conversion and to maintain a combustion front temperature in the range of about 825 to 1300° F.

17. The method of claim 16 wherein the oxygen partial pressure in the combustion step is lower than the oxygen partial pressure in the oxidizing step.

18. The method of claim 15 wherein the oxidizing step is effected under a superatmospheric pressure of at least about 50 p.s.i.g.

19. The method of claim 15 wherein the oxidizing step is effected after a plurality of repeated cycles of naphtha conversion under hydroforming conditions and regeneration under carbon-burning conditions.

20. The method of claim 15 wherein the oxidizing step is effected at a temperature below 1200° F. and the catalyst contains at least .1 percent of a halide selected from the class consisting of fluoride and chloride.

21. A cycling hydroforming process which comprises contacting a naphtha charging stock with a bed of catalyst containing about .1 to 1 percent by weight of platinum on alumina under hydroforming conditions which cause the catalyst to accumulate carbonaceous deposits and to decline in activity and selectivity, then discontinuing the contacting of said catalyst with charging stock and passing a regeneration gas stream containing about .5 to 2 percent oxygen through said bed to effect controlled combustion of carbonaceous deposits and to maintain a combustion zone temperature in the range of about 825 to 1300° F., whereby the catalyst is regenerated and most of the carbonaceous deposits are removed, and then treating the catalyst by passing through said bed a gas which has been preheated to a temperature in the range of about 950 to 1300° F. and which contains free oxygen in an amount to provide an oxygen partial pressure in the range of about .4 to 10 atmospheres for a period of time which is at least .1 hour and sufficient to substantially overcome the gradual loss of activity from cycle to cycle which would be experienced in the absence of the treating step.

22. The method of claim 21 wherein the hydroforming conditions include a temperature in the range of about 850 to 1000° F. and a pressure in the range of 50 to 350 p.s.i.g. and wherein both the regeneration and the treating steps are carried out under superatmospheric pressure in the range of about 50 to 350 p.s.i.g.

23. The method of claim 21 wherein the hydroforming conditions include a superatmospheric pressure of at least 50 p.s.i.g. and wherein the regeneration and treating steps are also effected under a superatmospheric pressure of at least 50 p.s.i.g.

24. The method of claim 21 wherein oxygen is employed in the treating step at a pressure of about 1 atmosphere.

25. The method of claim 21 wherein the catalyst contains at least .1 percent of a halide selected from the class consisting of fluoride and chloride and wherein the temperature of the treating step does not exceed 1200° F.

26. The method of treating a platinum-alumina, naptha hydroforming catalyst whose activity, selectivity and activity decline rate have substantially depreciated in a series of hydroforming-regeneration cycles and which contains only a small amount of carbonaceous material, which method comprises contacting said catalyst at a temperature in the range of about 950 to 1300° F. with a gas having a free oxygen partial pressure greater than about .4 atmosphere for a period of time which is greater than .1 hour and which is sufficient to restore the catalyst activity, selectivity, and activity decline rate properties to substantially those exhibited by fresh catalyst when subsequently employed for on stream hydroforming.

27. The method of claim 26 wherein the treating step is effected at a temperature higher than 1000° F.

28. The method of claim 26 wherein oxygen is employed in the treating step at a pressure of about 1 atmosphere.

29. The method of claim 26 wherein the treating is effected at a superatmospheric pressure of at least 50 p.s.i.g.

30. The method of claim 26 wherein the treating step is effected at a temperature higher than 1000° F. at a pressure higher than 50 p.s.i.g. with an oxygen partial pressure higher than one atmosphere.

31. The method of claim 26 wherein the catalyst contains at least .1 percent of a halide selected from the class consisting of fluoride and chloride and the treating temperature does not exceed 1200° F.

32. The method of restoring activity of a platinum-alumina hydroforming catalyst which has become partially deactivated and contaminated with carbon, which method comprises removing readily combustible carbon from and treating the partially deactivated catalyst under oxidizing conditions, said treating being with an oxygen-containing gas having an oxygen partial pressure of at least about .4 atmosphere at a temperature of about 950°–1300° F. for a period of at least 10 minutes and which is sufficient to restore substantially the hydroforming properties of the catalyst as freshly prepared.

33. The method of treating a deactivated carbon-containing platinum-alumina hydroforming catalyst which has been subjected to a plurality of cycles including in each said cycle a hydroforming operation in the presence of said catalyst and a regeneration of said catalyst under mild oxidative conditions whereby the activity of said catalyst has been substantially reduced and said catalyst can no longer be regenerated by mild oxidative treatment to restore it to substantially its activity as freshly prepared comprising subjecting said deactivated catalyst to a mild oxidative regeneration with dilute oxygen for a period of time sufficient to remove readily combustible carbon and then subjecting the catalyst to treatment at a temperature in the range from about 950° to 1300° F. with an oxygen-containing gas at an oxygen partial pressure above about 0.4 atmosphere for a period of time of at least 10 minutes and sufficient to restore substantially the hydroforming properties of the catalyst as freshly prepared.

34. The method of treating a deactivated carbon-containing platinum-alumina hydroforming catalyst which has been subjected to a plurality of cycles including in each said cycle a hydroforming operation in the presence of said catalyst and a regeneration of said catalyst under mild oxidative conditions whereby the activity of said catalyst has been substantially reduced and said catalyst can no longer be regenerated by mild oxidative treatment to restore it to substantially its activity as freshly prepared comprising subjecting said deactivated catalyst which is substantially free from readily combustible carbon to treatment at a temperature in the range from about 950° F. to 1300° F. with an oxygen-containing gas at an oxygen partial pressure above about 0.4 atmosphere for a period of time of at least 10 minutes and sufficient to restore substantially the hydroforming properties of the catalyst as freshly prepared.

35. The naphtha hydroforming system of claim 14 wherein the dilute oxygen in the regeneration step is at a partial pressure of about 0.1 and 100 pounds per square inch and wherein the gas reactable with platinum in the further treating step is oxygen having a partial pressure in said range and higher than the oxygen partial pressure employed in burning readily combustible carbonaceous deposits from the catalyst in the regeneration step.

36. The naphtha hydroforming system of claim 14 wherein during said burning in said regeneration step the temperature attained in the combustion zone is above said average bed temperature and in the range of about 825° to 1300° F.

37. The method of claim 36 wherein the gas reactable with platinum in the further treating step is oxygen and wherein the superatmospheric pressure of said contacting step approximates the pressure employed in hydroforming.

38. The method of claim 14 wherein the contacting step is effected after a plurality of repeated cycles of naphtha conversion under hydroforming conditions and regeneration under carbon-burning conditions.

No references cited.

UNITED STATES PATENT OFFICE
CERTIFICATE OF CORRECTION

Patent No. 3,011,968                                                December 5, 1961

Glenn M. Webb

It is hereby certified that error appears in the above numbered patent requiring correction and that the said Letters Patent should read as corrected below.

Column 6, line 16, for "any" read -- an --; column 17, line 29, for "1100°" read -- 1100° F. --; column 21, lines 7 and 8, for "compresses" read -- comprises --; column 24, line 23, for "cycling" read -- cyclic --.

Signed and sealed this 17th day of July 1962.

(SEAL)
Attest:

ERNEST W. SWIDER                                        DAVID L. LADD
Attesting Officer                                           Commissioner of Patents